W. NIELSON.

Improvement in Glass Decorations.

No. 129,856.            Patented July 23, 1872.

Witnesses.
Ernst Bilhuber.
C. Wahlers.

Inventor.
William Nielson
Van Santvoord & Hauff
Attys

UNITED STATES PATENT OFFICE.

WILLIAM NIELSON, OF NEW YORK, N. Y.

IMPROVEMENT IN GLASS DECORATIONS.

Specification forming part of Letters Patent No. 129,856, dated July 23, 1872.

*To all whom it may concern:*

Be it known that I, WILLIAM NIELSON, of the city, county, and State of New York, have invented a new and useful Improvement in the Manufacture of Glass Decorations; and I do hereby declare the following to be a full, clear, and exact description thereof, which will enable those skilled in the art to make and use the same, reference being had to the accompanying drawing forming part of this specification,—in which drawing—

Figure 1:
Figure 2:
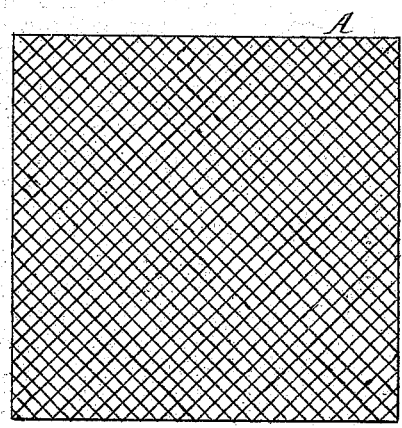

Figure 1 represents a transverse section of my invention. Fig. 2 is an inverted plan of the same.

Similar letters indicate corresponding parts.

This invention consists in a glass decoration produced by first applying to the back of a pane of glass a suitable design in oil-paint, then spreading over the paint, before the same is dry, a layer of sawdust, and over the sawdust a layer of plaster of Paris, in such manner that an article is obtained which can be readily attached to a wall, and which, when attached, preserves its beauty for a long time.

In the drawing, the letter A designates a pane of glass, which is provided with any desired design, produced by applying oil-paint to its back. Before this oil-paint is dry I spread over it a layer of sawdust, and as the paint dries the sawdust is firmly retained; or, if desired, the paint used for the design may be left to dry and an additional layer of paint may be applied to retain the sawdust. After the paint has dried I moisten the sawdust and spread over it a layer of plaster of Paris, the sawdust forming the means for uniting the plaster of Paris with the glass. After the plaster of Paris has dried my decoration is ready for the market; and if it is to be applied to a wall it is only necessary to spread over the back layer of plaster of Paris an additional coat of plaster of Paris and press this up against the wall, retaining it in position until the plaster of Paris has set.

What I claim as new, and desire to secure by Letters Patent, is—

A glass decoration produced by applying to its back a suitable design in oil-paint, then spreading thereon a layer of sawdust, and on the sawdust a layer of plaster of Paris, substantially in the manner herein set forth.

W. NIELSON.

Witnesses:
JOHN YOLCK,
E. F. KASTENHUBER.